United States Patent [19]

Hiratani et al.

[11] Patent Number: 5,502,086
[45] Date of Patent: Mar. 26, 1996

[54] WATER-ABSORPTIVE CONTACT LENS AND PROCESS FOR ITS PRODUCTION

[75] Inventors: Haruyuki Hiratani; Keiji Sugimoto, both of Nagoya, Japan

[73] Assignee: Menicon Co., Ltd., Nagoya, Japan

[21] Appl. No.: 262,457

[22] Filed: Jun. 20, 1994

[30] Foreign Application Priority Data

Aug. 4, 1993 [JP] Japan .................. 5-193527

[51] Int. Cl.$^6$ .................... C08L 29/00
[52] U.S. Cl. .............. 523/108; 523/106; 525/242; 525/275; 525/276; 525/279; 525/283; 525/292; 525/293; 525/296; 525/297; 525/298; 525/301; 525/302; 525/303; 525/304; 525/311; 525/312; 525/313; 525/315
[58] Field of Search .................... 525/276, 283, 525/293, 296, 297, 301, 304, 312, 242, 275, 279, 313; 523/106, 108; 526/292, 298, 302, 303, 311, 315

[56] References Cited

U.S. PATENT DOCUMENTS

| | | | |
|---|---|---|---|
| 4,727,097 | 2/1988 | Kobayashi et al. | 525/283 X |
| 4,745,158 | 5/1988 | Nakashima et al. | 525/283 X |
| 4,829,126 | 5/1989 | Nakajima et al. | 525/283 |
| 4,921,908 | 5/1990 | Ofstead | 525/61 |
| 4,978,713 | 12/1990 | Goldenberg | 525/61 |

FOREIGN PATENT DOCUMENTS

| | | |
|---|---|---|
| 0279007 | 8/1988 | European Pat. Off. . |
| 0332179 | 9/1989 | European Pat. Off. . |
| 0589430 | 3/1994 | European Pat. Off. . |

*Primary Examiner*—Judy M. Reddick
*Attorney, Agent, or Firm*—Oblon, Spivak, McClelland, Maier & Neustadt

[57] ABSTRACT

A water-absorptive contact lens obtained by saponification of a copolymer composed essentially of (A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components; (B) from 45 to 95% by weight of a fatty acid vinyl ester; (C) from 0.02 to 10% by weight of a crosslinking agent which is not decomposable by saponification; and (D) from 0.1 to 20% by weight of a crosslinking agent which is decomposable by saponification.

11 Claims, No Drawings

WATER-ABSORPTIVE CONTACT LENS AND PROCESS FOR ITS PRODUCTION

The present invention relates to a water-absorptive contact lens and its production. More particularly, it relates to a water-absorptive contact lens which has a high water content and presents a comfortable feeling to the wearer even after application of saponification treatment and a method for producing the water-absorptive contact lens, whereby mechanical processing is easy.

A vinyl acetate monomer is a monomer excellent in radical polymerizability. However, polyvinyl acetate made of such a vinyl acetate monomer has a problem such that the glass transition temperature is too low, and processing is hardly applicable when it is intended to use it practically as an ocular lens material.

To solve such a problem, it has been attempted to copolymerize the vinyl acetate monomer with various monomers to increase the glass transition temperature of the resulting polymer so that processing can be applied to such a lens material.

However, vinyl acetate has poor copolymerizability with a usual vinyl monomer such styrene or methyl methacrylate and is likely to form a homopolymer. Accordingly, a special polymerization method is required. Further, even if vinyl acetate is copolymerized with ethylene or a vinyl-type monomer having a relatively good copolymerizability, the proportion of vinyl acetate is limited in view of the operation efficiency due to the tackiness of the resulting polymer, and it is difficult to produce a polymer processable into a lens.

Further, if vinyl acetate is copolymerized with a polyfunctional monomer commonly employed as a contact lens material, such as ethylene glycol dimethacrylate, the resulting vinyl acetate type copolymer will have a high glass transition temperature, whereby processing treatment can be applied to such a lens material if carried out before application of saponification treatment, but once saponification treatment has been applied to such a lens material, the water content decreases, and the flexibility will be poor, thus leading to a problem that the resulting water-absorptive contact lens presents an uncomfortable feeling to the wearer.

Under these circumstances, the present inventors have conducted extensive researches in view of the above described prior art to develop a water-absorptive contact lens which has a high water content and presents a comfortable feeling to the wearer even after the application of saponification treatment and a process for producing such a water-absorptive contact lens, whereby mechanical processing is easy. As a result, they have finally found such a water-absorptive contact lens and a process for its production and have accomplished the present invention.

Thus, the present invention provides a water-absorptive contact lens obtained by saponification of a copolymer composed essentially of:

(A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components;

(B) from 45 to 95% by weight of a fatty acid vinyl ester;

(C) from 0.02 to 10% by weight of a crosslinking agent which is not decomposable by saponification; and (D) from 0.1 to 20% by weight of a crosslinking agent which is decomposable by saponification.

Further, the present invention provides a process for producing a water-absorptive contact lens, which comprises polymerizing polymer components composed essentially of:

(A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components;

(B) from 45 to 95% by weight of a fatty acid vinyl ester;

(C) from 0.02 to 10% by weight of a crosslinking agent which is not decomposable by saponification; and (D) from 0.1 to 20% by weight of a crosslinking agent which is decomposable by saponification, to obtain a copolymer, mechanically processing the copolymer into a contact lens-shaped product and then saponifying the contact lens-shaped product.

Now, the present invention will be described in detail with reference to the preferred embodiments.

As mentioned above, the water-absorptive contact lens of the present invention is the one obtained by saponifying a copolymer composed essentially of (A) from 1 to 30% by weight of a (meth)acrylate polymer having at least one polymerizable group per molecule on an average obtained by copolymerizing an alkyl (meth)acrylate and a monomer having at least two polymerizable groups per molecule, as the main components (hereinafter referred to as the polymer (A)), (B) from 45 to 95% by weight of a fatty acid vinyl ester (hereinafter referred to as the ester (B)), (C) from 0.02 to 10% by weight of a crosslinking agent which is not decomposable by saponification (hereinafter referred to as the crosslinking agent (C)), and (D) from 0.1 to 20% by weight of a crosslinking agent which is decomposable by saponification (hereinafter referred to as the crosslinking agent (D)).

The polymer (A) to be used in the present invention has at least one polymerizable group per molecule on an average, and thus is efficiently copolymerizable with monomers having polymerizable groups. Especially, when the polymer (A) has at least two polymerizable groups, the number of chemical crosslinking sites increases by the copolymerization with said monomers having polymerizable groups, whereby it is possible to obtain a water-absorptive contact lens which undergoes no macro phase-separation upon absorption of water and which has excellent transparency and durability such as mechanical strength, solvent resistance, dimensional stability and boiling resistance.

The polymer (A) is obtained by copolymerizing an alkyl (meth)acrylate (hereinafter referred to simply as a component (a)) and a monomer having at least two polymerizable groups per molecule (hereinafter referred to simply as a component (b)), as the main components.

The component (a) is an alkyl (meth)acrylate in which the alkyl group is a linear, branched or cyclic alkyl group or such an alkyl group with hydrogen atoms substituted by fluorine atoms.

Specific examples of the component (a) include methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate, pentafluoropropyl (meth)acrylate and hexafluoroisopropyl (meth)acrylate. These monomers may be used alone or in combination as a mixture of two or more of them.

As the component (a), it is preferred to employ e.g. a lower alkyl (meth)acrylate having from 1 to 6 carbon atoms, since it is thereby possible to conduct the copolymerization of the polymer (A) made of such a component (a) with copolymerizable monomers without bringing about a steric hindrance.

Specific examples of the component (b) include monomers having at least two polymerizable groups per molecule, such as allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate. These monomers may be used alone or in combination as a mixture of two or more of them.

When the copolymerizability of the polymer (A) with other copolymerizable monomers, is taken into consideration, it is preferred to use as the component (b) an acrylate having a vinyl-type polymerizable group such as an allyl group or a vinyl group, such as allyl (meth)acrylate or vinyl (meth)acrylate.

The molar ratio of the component (a) to the component (b) is preferably from 80/20 to 99.97/0.03, more preferably from 95/5 to 99.95/0.05. If the amount of the component (b) is less than the above lower limit, it tends to be difficult to obtain a satisfactory copolymer of the polymer (A) with other copolymerizable monomers, and the product tends to be a mixture comprising the polymer (A) and a polymer composed of other monomers. On the other hand, if the amount exceeds the above upper limit, the crosslinking degree of the polymer (A) with other copolymerizable monomers tends to be too high.

The polymer (A) comprises the above components (a) and (b) as the main components. However, it may contain as an additional component a hydrophilic monomer, for example, a hydroxyl group-containing (meth)acrylate such as hydroxyethyl (meth)acrylate or hydroxybutyl (meth)acrylate, (meth)acrylic acid, dimethyl (meth)acrylamide, or N-vinylpyrrolidone.

Further, it is preferred to adjust the sum of the components (a) and (b) to be at least 70 mol %, preferably at least 80 mol %, based on the total amount of monomer components constituting the polymer (A).

As a method to obtain the above polymer (A), a solution polymerization method may, for example, be mentioned in which the above described respective components are dissolved in a solvent, a polymerization initiator is added thereto, and polymerization is conducted at a refluxing temperature with stirring.

There is no particular restriction as to the solvent to be used for the solution polymerization method, and any solvent may be employed so long as it provides good solubility for the above-mentioned various components and it does not impair the polymerization reaction. As such a solvent, benzene or acetone may, for example, be mentioned. These solvents may be used alone or in combination as a mixture of two or more of them. The amount of the solvent varies depending upon the conditions such as the polymerization temperature and time and the types of the components to be polymerized. Accordingly, the amount may be suitably adjusted as the case requires.

As the polymerization initiator, azobisisobutylonitrile, azobisdimethylvaleronitrile, t-butylhydroperoxide, cumene hydroperoxide or benzoyl peroxide may, for example, be used. The amount of such a polymerization initiator is not critical so long as it is sufficient to initiate the polymerization. For example, it is usually from 0.01 to 5 parts by weight, preferably from 0.05 to 2 parts by weight, per 100 parts by weight of the total of the above polymer components.

The polymerization temperature and the time are interrelated and can not generally be defined. However, the polymerization time may, for example, be from a few minutes to a few hours at a relatively low temperature of e.g. from 50° to 80° C.

The number average molecular weight of the polymer (A) thus obtained is preferably from about 5,000 to 200,000, particularly from about 10,000 to 100,000, since it is influential over the mechanical strength, etc. of the desired water-absorptive contact lens. If such a number average molecular weight is too small, the mechanical strength of the water-absorptive contact lens tends to be poor. On the other hand, if the number average molecular weight is too large, the polymer (A) tends to be hardly uniformly mixed with other monomer components at the time of copolymerization, whereby it tends to be difficult to obtain a uniform water-absorptive contact lens.

The polymer (A) has at least one polymerizable group per molecule on an average and thus is well copolymerizable with monomers having polymerizable groups, whereby reinforcing effects for the polymer (A) will be obtained.

The number of such polymerizable groups is preferably at most about five per molecule of the polymer (A). If the number of such polymerizable groups is too large, the crosslinking density of the resulting polymer at the time of copolymerization with other polymer components, tends be too high, whereby the water content of the contact lens tends to be low, and the material tends to be brittle.

The amount of the polymer (A) is usually from 1 to 30% by weight, preferably from 5 to 25% by weight, based on the copolymer comprising the polymer (A), the ester (B), the crosslinking agent (C) and the crosslinking agent (D) as the main components. If the amount of the polymer (A) is less than 1% by weight, no adequate reinforcing effects tend to be obtained, and if it exceeds 30% by weight, the water content of the resulting water-absorptive contact lens tends to be low.

In the present invention, the ester (B) is the main component to obtain a polyvinyl alcohol.

The above ester (B) may be the one wherein the hydrogen atoms in the fatty acid are substituted by halogen atoms such as fluorine atoms or chlorine atoms. Specific examples of such ester (B) include vinyl formate, vinyl acetate, vinyl propionate, vinyl butyrate, vinyl pivalate, vinyl laurate, vinyl stearate, vinyl monochloroacetate, vinyl trifluoroacetate and vinyl trichloroacetate. These vinyl esters may be used alone or in combination as a mixture of two or more of them.

Among the above esters (B), a lower fatty acid vinyl ester is preferred from the viewpoint of easy treatment by saponification. In view of the availability, vinyl acetate and vinyl trifluoroacetate are preferred.

The amount of the ester (B) is usually from 45 to 95% by weight, preferably from 55 to 90% by weight, based on the copolymer comprising the polymer (A), the ester (B), the crosslinking agent (C) and the crosslinking agent (D) as the main components. If the amount of the ester (B) is less than 45% by weight, the water content of the resulting water-absorptive contact lens tends to be low, and if it exceeds 95% by weight, the boiling resistance and the freezing resistance of the resulting water-absorptive contact lens tend to be poor.

In the present invention, the crosslinking agent (C) is a component to improve the heat resistance so that the resulting water-absorptive contact lens can be subjected to boiling for disinfection.

As the crosslinking agent (C), there may preferably be employed, for example, a crosslinking agent which (1) has a polymerizable group readily copolymerizable with other polymer components including the ester (B), such as a vinyl group or an allyl group, and (2) is readily soluble in and can uniformly be mixed with other polymer components including the ester (B). If the crosslinking agent (C) is the one which has only a polymerizable group having poor copolymerizability, it is difficult to improve the physical properties such as the mechanical strength, or to minimize elution of substances from the resulting copolymer. Further, if the crosslinking agent (C) is not uniformly dissolved in the polymer components, not only a homogeneous material can hardly be obtained but also a transparent material can hardly be obtained.

The crosslinking agent (C) having such properties, includes, for example, a compound having the formula:

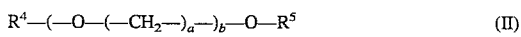

wherein each of $R^4$ and $R^5$ which may be the same or different, is $-CH=CH_2$ or $-CH_2-CH=CH_2$ and each of a and b is an integer of from 0 to 5, provided that when a is 0, b is 0; or a compound having the formula:

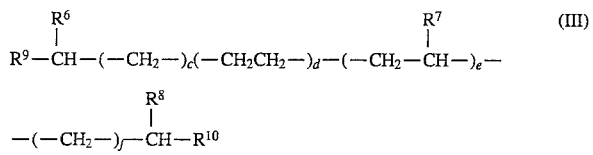

wherein each of $R^6$, $R^7$ and $R^8$ which may be the same or different, is $-CH=CH_2$ or $-CH_2-CH=CH_2$, each of $R^9$ and $R^{10}$ which may be the same or different, is a hydrogen atom, $-CH_3$, $-(CH_2)_g-OH$ wherein g is an integer of from 1 to 5, $-(-CH_2CH_2O)_h-R^{11}$ wherein $R^{11}$ is a hydrogen atom or $-CH_3$, h is an integer of from 0 to 12, or $-COOR^{12}$ wherein $R^{12}$ is a hydrogen atom or $-CH_3$, c is an integer of from 0 to 3, d is an integer of from 0 to 500, e is an integer of from 0 to 10,000, and f is an integer of from 0 to 3; or allyl (meth)acrylate.

Specific examples of the crosslinking agent (C) having the formula II include, for example, ethylene glycol diallyl ether, ethylene glycol divinyl ether, ethylene glycol allylvinyl ether, diethylene glycol diallyl ether, diethylene glycol divinyl ether, diethylne glycol allylvinyl ether, triethylene glycol diallyl ether, triethylene glycol divinyl ether, triethylene glycol allylvinyl ether, tetraethylene glycol diallyl ether, tetraethylene glycol divinyl ether, tetraethylene glycol allylvinyl ether, pentaethylene glycol diallyl ether, pentaethylene glycol divinyl ether, pentaethylene glycol allylvinyl ether, diallyl ether, divinyl ether, allyl vinyl ether, propylene glycol diallyl ether, propylene glycol divinyl ether, propylene glycol allylvinyl ether, dipropylene glycol diallyl ether, dipropylene glycol divinyl ether, dipropylene glycol allylvinyl ether, tripropylene glycol diallyl ether, tripropylene glycol divinyl ether, tripropylene glycol allylvinyl ether, tetrapropylene glycol diallyl ether, tetrapropylene glycol divinyl ether, tetrapropylene glycol allylvinyl ether, butylene glycol diallyl ether, butylene glycol divinyl ether, butylene glycol allylvinyl ether, dibutylene glycol diallyl ether, dibutylene glycol divinyl ether, dibutylene glycol allylvinyl ether, tributylene glycol diallyl ether, tributylene glycol divinyl ether, tributylene glycol allylvinyl ether, tetrabutylene glycol diallyl ether, tetrabutylene glycol divinyl ether, and tetrabutylene glycol allylvinyl ether. Further, specific examples of the cross linking agent (C) of the formula III include, for example, NISSO-PB B series and NISSO-PB G series (which are manufactured by Nippon Soda Kabushiki Kaisha). Such crosslinking agents (C) may be used alone or in combination as a mixture of two or more of them.

The amount of the above crosslinking agent (C) is usually from 0.02 to 10% by weight, preferably from 0.1 to 10% by weight, based on the copolymer comprising the polymer (A), the ester (B), the crosslinking agent (C) and the crosslinking agent (D) as the main components. If the amount of the crosslinking agent (C) is less than 0.02% by weight, the copolymer will not undergo adequate crosslinking, whereby the boiling resistance of the resulting water-absorptive contact lens tends to be poor. On the other hand, if it exceeds 10% by weight, the water content of the resulting water-absorptive contact lens tends to be low, and the elasticity tends to be poor.

In the present invention, the crosslinking agent (D) is a component which facilitates mechanical processing of the copolymer used for the water-absorptive contact lens of the present invention. By using such a crosslinking agent (D), the resulting copolymer will have sufficient strength to be durable against mechanical processing such as cutting or grinding, and thus the processability will be improved. Accordingly, when such a copolymer is mechanically processed, followed by saponification, the crosslinked portions derived from the crosslinking agent (D) will be decomposed and hydrated and will be removed from the obtained contact lens, whereby the residues of the crosslinking agent (D) after the saponification treatment will be a vinyl alcohol which serves to improve the water content of the contact lens. The crosslinking agent (D) may, for example, be a compound of the formula (I):

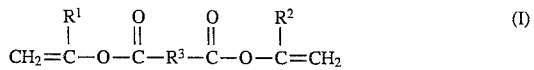

wherein each of $R^1$ and $R^2$ which may be the same or different, is a hydrogen atom or a methyl group, and $R^3$ is a $C_{1-10}$ alkylene group. Specific examples of such a compound of the formula (I) include divinyl adipate, divinyl malonate, divinyl succinate and divinyl glutarate.

Such crosslinking agents (D) may be used alone or in combination as a mixture of two or more of them. Among them, however, divinyl adipate is preferred for the reason that it is highly effective for improving the strength of the copolymer and the water content of the contact lens.

The amount of the above crosslinking agent (D) is usually from 0.1 to 20 wt %, preferably from 0.1 to 10 wt %, based on the copolymer comprising the polymer (A), the ester (B), the crosslinking agent (C) and the crosslinking agent (D) as the main components. If the amount of the crosslinking agent (D) is less than 0.1 wt %, no adequate strength will be imparted to the resulting copolymer, and it tends to be difficult to apply mechanical processing such as cutting or grinding. On the other hand, if it exceeds 20 wt %, it tends to be difficult to obtain a uniform copolymer.

As mentioned above, the copolymer to be used for the water-absorptive contact lens of the present invention comprises the polymer (A), the ester (B), the crosslinking agent (C) and the crosslinking agent (D) as the main components. However, in the present invention, other monomers (hereinafter referred to as monomers (E)) copolymerizable therewith can be used as polymer components for the purpose of further improving e.g. the mechanical strength, the hydrophilic nature and the dimensional stability for the resulting water-absorptive contact lens.

The monomers (E) include, for example, (meth)acrylate monomers such as methyl (meth)acrylate, ethyl (meth)acrylate, propyl (meth)acrylate and butyl (meth)acrylate, (meth)acrylamides such as dimethyl (meth)acrylamide and diethyl (meth)acrylamide, and N-vinyl lactams such as N-vinylpyrrolidone, N-vinylpiperidine and N-vinylcaprolactam. These monomers may be used alone or in combination as a mixture of two or more of them. Among them, methyl methacrylate, dimethyl acrylamide and N-vinylpyrrolidone are preferred.

The amount of the monomers (E) may be optionally adjusted taking the types and amounts of the polymer (A), the ester (B), the crosslinking agent (C) and the crosslinking agent (D) into consideration.

To obtain the water-absorptive contact lens of the present invention, a method is preferably employed wherein the polymer components such as the polymer (A), the ester (B), the crosslinking agent (C) and the crosslinking agent (D), as well as necessary monomers (E), with their amounts respectively adjusted, are polymerized to obtain a copolymer, and mechanical processing is applied to the obtained copolymer, followed by saponification.

As specific examples of a method for preparing the above copolymer, there may be mentioned, for example, a method wherein a radical polymerization initiator is mixed with the polymer components, the mixture is heated, for example, at a temperature of from about 40° to 50° C. for from a few hours to a few tens hours for polymerization and then the temperature is gradually raised to 120° C. over a period of ten or more hours to complete the polymerization (heat polymerization), a method wherein a photo polymerization initiator is mixed with the polymer components, and then, a light having a wave length corresponding to the absorption band for activating the photo polymerization initiator, such as ultraviolet rays, is irradiated to the mixture (photo polymerization), or a method wherein polymerization is conducted by a combination of the heat polymerization and the photo polymerization.

At the time of such polymerization, crosslinked structures will be formed in the resulting copolymer by the action of the crosslinking agents (C) and (D), whereby the mechanical strength of the copolymer will be improved.

When the above-mentioned heat polymerization is employed, the mixture may be heated in a constant temperature bath or in a constant temperature room, or by irradiation of an electromagnetic wave such as a micro wave. The heating may be conducted stepwise. When the above-mentioned photo polymerization is employed, a sensitizer may further be added.

For the preparation of the copolymer in the present invention, a usual bulk polymerization method is preferably employed to obtain it with good productivity at high production efficiency. If necessary, a solution polymerization method may be employed.

Specific examples of the radical polymerization initiator include, for example, azobisisobutylonitrile, azobisdimethylvaleronitrile, benzoyl peroxide, tertbutylhydro peroxide and cumene peroxide.

Specific examples of the photo polymerization initiator include, for example, a benzoin type photo polymerization initiator such as benzoin, methyl-o-benzoyl benzoate, methyl-o-benzoyl benzoate, methylbenzoyl formate, benzoin methyl ether, benzoin ethyl ether, benzoin isopropyl ether, benzoin isobutyl ether or benzoin-n-butyl ether; a phenone type photo polymerization initiator such as 2-hydroxy-2-methyl-1-phenylpropan- 1-one, p-isopropyl-α-hydroxyisobutyrophenone, p-tertbutyltrichloroacetophenone, 2,2-dimethoxy-2-phenylacetophenone, α,α-dichloro-4-phenoxyacetophenone or N,N,N,N-tetraethyl-4,4-diaminobenzophenone; 1-hydroxycyclohexyl phenyl ketone; 1-phenyl-1,2-propanedopme- 2-(o-ethoxycarbonyl)oxime; a thioxanethone type photo polymerization initiator such as 2-chlorothioxanethone or 2-methylthioxanethone; dibenzosuberone; 2-ethylanthraquinone; benzophenone acrylate; benzophenone; and benzil.

One or more the radical polymerization initiators or photo polymerization initiators may suitably selected for use from these examples. The amount of the polymerization initiator is suitably within a range of from about 0.001 to 5 parts by weight, preferably from about 0.01 to about 2 parts by weight, relative to 100 parts by weight of the total amount of the polymer components.

The glass transition temperature of the copolymer thus obtained is preferably at least about 38° C. as measured by e.g. a differential scanning calorimeter (DSC220, manufactured by Seiko Denshi Kogyo Kabushiki Kaisha), since the copolymer is thereby scarcely deformable by e.g. a heat during the mechanical processing and is excellent in the processability e.g. cutting or grinding.

Then, mechanical processing is applied to the obtained copolymer to shape it into a water-absorptive contact lens. For such shaping, a conventional shaping method which is commonly employed by those skilled in the art may be employed. Such a shaping method may, for example, be a processing method such as cutting, grinding or polishing (a mechanical processing method) or a method which is a combination of such a mechanical processing method with a molding method by means of a mold.

The mechanical processing method is a method in which the polymer components are polymerized in a suitable mold or vessel to obtain e.g. a rod-, block- or plate-shaped polymer, and then, the mechanical processing such as cutting, grinding or polishing is applied to the polymer to shape it into a desired contact lens.

In the combination of the mechanical processing method and the molding method, a mold (casting mold) corresponding to at least one surface of a desired contact lens, is firstly prepared, and the polymer components are polymerized in the mold. Then, the mechanical processing is applied to form the other surface of the contact lens to obtain a contact lens product.

When only the mechanical processing method is employed, it is advisable to conduct the shaping into a contact lens prior to the below-mentioned saponification treatment, since the mechanical processing can hardly be applied after the saponification treatment.

As compared with the mechanical processing method only, the combination of the molding method and the mechanical processing method has advantages such that the starting material components may be in small amounts, the number of process steps may be small, and further, the time required for polymerization may be short.

The copolymer thus mechanically processed, is then subjected to saponification, to obtain a water-absorptive contact lens.

Here, the saponification means treatment of the units derived from the ester (B) decomposable by saponification and the crosslinking agent (D) in the copolymer, with an alkaline or acidic compound in accordance with a conventional saponification method for a polyvinyl ester to convert the units into a carboxylic acid or an alcohol.

However, the saponification with an acidic compound is slow, and it is thereby rather difficult to obtain a homogeneous product, and it has a further drawback that the side reaction takes place. Therefore, the saponification with an alkaline compound is preferred.

The alkaline compound useful for the saponification is a hydroxide of ammonia, an alkali metal or an alkaline earth metal. Specific examples of such an alkaline compound include ammonium hydroxide, sodium hydroxide, potassium hydroxide and calcium hydroxide. These alkaline compounds are usually solid. Therefore, they may be usually dissolved in alcohols or ethers so that they are used for the saponification reaction in the form of alkaline solutions.

The alcohols include methanol, ethanol, propyl alcohol and butyl alcohol. The ethers include diethyl ether and tetrahydrofuran.

Among the alkaline solutions of alkaline compounds useful for saponification, those employing alcohols are preferred. Among them, a 0.1–1.0N alkali alcohol solution is particularly preferred. To let the saponification treatment proceed efficiently, it is possible to mix an aqueous alkaline solution to the alkali alcohol solution.

The saponification is conducted by immersing the above-mentioned copolymer in the alkaline solution.

The reaction temperature for the saponification is usually within a range of from 0° to 100° C., preferably from 10° to 70° C. The reaction time for the saponification varies depending upon the type of the alkaline compound, the concentration of the alkaline compound and the reaction temperature for the saponification, and therefore can not generally be defined. For the practical operation, however, if the saponification reaction can not be completed at room temperature in a few hours, it is preferred to warm up the solution for the saponification treatment. Further, the saponification reaction can be conducted in the heterogeneous system.

Here, it is desirable that the saponification degree of the units derived from the ester (B) and the crosslinking agent (D) as the saponifiable units in the copolymer, is at least 90 mol %. If such a saponification degree is less than 90 mol %, the desired water content tends to be hardly attained, or the resulting water-absorptive contact lens tends to be inferior in the long term stability such that the water content changes by repeated operation of e.g. boiling treatment during the use for a long period of time, whereby the size is likely to change.

The copolymer thus saponified, is then subjected to boiling treatment e.g. in a saline (a 0.9% sodium chloride aqueous solution) for a few hours to obtain a swelled water-absorptive contact lens which is safe to living bodies.

Now, the water-absorptive contact lens of the present invention and the process for its production will be described in further detail with reference to Examples. However, it should be understood that the present invention is by no means restricted to such specific Examples.

REFERENCE EXAMPLE 1

Preparation of a (meth)acrylate polymer having at least one polymerizable group per molecule on an average [polymethyl methacrylate (polymer (A))]

Into a three-necked round bottom flask, 99 g of methyl methacrylate, 1 g of allyl methacrylate, 0.5 g of azobisisobutyronitrile as a polymerization initiator and 720 ml of benzene as a solvent, were added and polymerized with stirring at a refluxing temperature for 2 hours. Then, the polymerization solution thus obtained was poured into n-hexane, and the copolymer precipitated was collected and dried under reduced pressure. The copolymer was dissolved in benzene, and then poured into a large amount of n-hexane, whereby it was again precipitated for purification. The precipitates were collected and dried under reduced pressure to obtain polymethyl methacrylate (hereinafter referred to as PMMA).

The number average molecular weight and the average number of polymerizable groups per molecule of PMMA thus obtained, were measured in accordance with the following methods. As a result, the number average molecular weight was 23,000, and the average number of polymerizable groups per molecule was 1.8.

Number Average Molecular Weight

Measured by gel permeation chromatography.

Average Number of Polymerizable Groups Per Molecule

Measured by gel permeation chromatography and Fourier's conversion proton nuclear magnetic resonance spectroscopy.

EXAMPLE 1

Into a 100 ml Erlenmeyer flask, 15 parts by weight of PMMA obtained in Reference Example 1 was charged, and 50 parts by weight of vinyl acetate (ester (B)), 0.25 part by weight of diethylene glycol diallyl ether (crosslinking agent (C)), 0.5 part by weight of divinyl adipate (crosslinking agent (D)) and 35 parts by weight of N-vinyl-2-pyrrolidone (monomer (E)) were added thereto and completely dissolved. Then, 0.04 part by weight of 2,2'-azobis(2,4-dimethylvaleronitrile) as a polymerization initiator was added and dissolved thereto. The solution was transferred to a glass test tube having an inner diameter of 14 mm.

Then, a polyethylene stopper was placed on the test tube, and the polymerization was conducted in a constant temperature bath at 30° C. for 64 hours. Then, the temperature was raised to 50° C., and the polymerization was conducted for 8 hours. The product was transferred to an air circulating oven. Here, the product was heated at 50° C. for 5 hours, and then heated for 9 hours while gradually raising the temperature from 60° C. to 110° C., to complete the polymerization. The product was cooled to room temperature and then heated at 90° C. for 2 hours to remove a distortion.

10 sheets of a film having a thickness of 0.2 mm and a diameter of 12 mm were prepared by cutting the rod-shaped material thereby obtained, and they were used as test specimens.

Using the test specimens, the glass transition temperatures and the cutting processability were examined in accordance with the following methods. The results are shown in Table 1.

(a) Glass Transition Temperature

Using a differential scanning calorimeter (DSC220, manufactured by Seiko Denshi Kogyo Kabushiki Kaisha), the glass transition temperature (°C.) of each test specimen was measured within the measuring temperature range of from room temperature to 150° C. and at a temperature raising rate of 20° C./min.

(b) Cutting Processability

The surface condition of each test specimen was visually inspected and evaluated in accordance with the following evaluation standards.

Evaluation Standards

A: Surface gloss is excellent.
B: Surface gloss is good.
C: Surface gloss is poor.
D: No gloss is observed on the surface, and the surface is roughened.

E: Cutting is impossible.

Then, into a Petri dish having a diameter of about 10 cm, about 50 ml of a methanol aqueous solution of 0.25 N sodium hydroxide was introduced. The above test specimens were immersed therein and left to stand at room temperature for 24 hours to complete saponification. After washing them with water, the test specimens and 500 ml of water were introduced to a 1 l Erlenmeyer flask, and boiled for 24 hours. After cooling, 500 ml of water was replaced by 500 ml of a saline, followed by boiling to replace water by the saline and to complete elution treatment.

The water content and the saponification degree of the test specimens were measured in accordance with the following methods. The results are shown in Table 1.

(c) Water Content

The water content (wt %) of a test specimen (thickness after cutting: 0.2 mm) was determined in accordance with the following equation.

Water content (wt %)=$[(W-W_0)/W] \times 100$ where W is the weight (g) of the test specimen upon absorption of water to the equilibrium state, and $W_0$ is the weight (g) of the test specimen in a dried state.

(d) Saponification Degree

The saponification degree (mol %) of a test specimen was measured in accordance with the method of JIS K-6726.

EXAMPLES 2 TO 10 AND COMPARATIVE EXAMPLES 1 AND 2

Test specimens were prepared in the same manner as in Example 1 except that the composition was changed as shown in Table 1, and the glass transition temperatures and the cutting processability were examined. Further, saponification and elution treatment were applied to these test specimens in the same manner as in Example 1, and with respect to the obtained test specimens, the water content and the saponification degree were measured. The results are shown in Table 1.

Abbreviations used in Table 1 represent the following compounds.

VAc: Vinyl acetate
TRIAM501: Diethylene glycol diallyl ether
AMA: Allyl methacrylate
DVAA: Divinyl adipate
NVP: N-vinyl-2-pyrrolidone
DMAA: N,N-Dimethylacrylamide
V-65: 2,2'-azobis(2,4-dimethylvaleronitrile)
AA: Allyl acrylate

TABLE 1

| | Composition (parts by weight) | | | | | | | | |
|---|---|---|---|---|---|---|---|---|---|
| | PMMA | VAc | TRIAM 501 | AMA | AA | DVAA | NVP | DMAA | V-65 |
| Example 1 | 15 | 50 | 0.25 | — | — | 0.5 | 35 | — | 0.04 |
| Example 2 | 17.5 | 58 | 0.2 | — | — | 2 | 22.5 | — | 0.04 |
| Example 3 | 17.5 | 63 | 0.2 | — | — | 2 | 17.5 | — | 0.04 |
| Example 4 | 7 | 88 | 0.2 | 1 | — | 2 | 3 | — | 0.09 |
| Example 5 | 17.5 | 73 | 0.2 | — | — | 2 | 7.5 | — | 0.09 |
| Example 6 | 15 | 73 | 0.2 | — | — | 2 | 10 | — | 0.09 |
| Example 7 | 7 | 90 | 0.5 | — | — | 3 | — | — | 0.09 |
| Example 8 | 17.5 | 64 | 0.2 | — | — | 6 | 22.5 | — | 0.04 |
| Example 9 | 10 | 77 | 0.2 | — | — | 3 | — | 10 | 0.09 |
| Example 10 | 10 | 83 | 0.4 | — | 2.5 | 2 | 5 | — | 0.1 |
| Comparative Example 1 | 20 | 80 | 0.25 | — | — | — | — | — | 0.07 |
| Comparative Example 2 | 32 | 68 | 0.25 | — | — | — | — | — | 0.07 |

| | Physical properties | | | |
|---|---|---|---|---|
| | Glass transition temp. (°C.) | Cutting processability | Water content (wt %) | Saponification degree (mol %) |
| Example 1 | 40 | A | 81 | ≧90 |
| Example 2 | 52 | A | 74 | ≧90 |
| Example 3 | 53 | A | 73 | ≧90 |
| Example 4 | 41 | A | 80 | ≧90 |
| Example 5 | 47 | A | 71 | ≧90 |
| Example 6 | 46 | A | 75 | ≧90 |
| Example 7 | 39 | B | 81 | ≧90 |
| Example 8 | 51 | A | 73 | ≧90 |
| Example 9 | 42 | A | 93 | ≧90 |
| Example 10 | 40 | A | 74 | ≧90 |
| Comparative Example 1 | 31 | D | 67 | ≧90 |
| Comparative Example 2 | 33 | D | 52 | ≧90 |

It is evident from the results shown in Table 1 that in Examples 1 to 10, the glass transition temperatures of the copolymers are high as compared with Comparative Examples 1 and 2 where no crosslinking agent (D) was used, and the surface gloss of the copolymers after cutting processing is excellent, and the water content is high.

By the process for producing a water-absorptive contact lens of the present invention, mechanical processing can be facilitated, and the obtained water-absorptive contact lens has a high water content even after application of saponification treatment, whereby adequate tear may be given to the eye to present comfortable feeling to the wearer without dry feeling.

We claim:

1. A water-absorptive contact lens obtained by saponification of a copolymer, consisting essentially of:
   (A) from 1 to 30% by weight of a (meth)acrylate polymer having at least one polymerizable group per molecule on average, which is obtained by copolymerizing (a) an alkyl (meth)acrylate and (b) a monomer having at least two polymerizable groups per molecule, as the main components;
   (B) from 45 to 95% by weight of a vinyl ester;
   (C) from 0.02 to 10% by weight of a crosslinking agent which is not decomposable by saponification; and
   (D) from 0.1 to 20% by weight of a crosslinking agent which is decomposable by saponification.

2. The water-absorptive contact lens according to claim 1, wherein the crosslinking agent (D) is a compound of the formula:

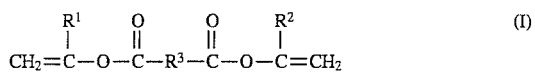

wherein each of $R^1$ and $R^2$, which is the same or different, is a hydrogen atom or a methyl group, and $R^3$ is a $C_{1-10}$ alkylene group.

3. The water-absorptive contact lens according to claim 1, wherein the alkyl (meth)acrylate of component (a) is at least one member selected from the group consisting of methyl (meth)acrylate, ethyl (meth)acrylate, propyl (meth)acrylate, butyl (meth)acrylate, pentyl (meth)acrylate, hexyl (meth)acrylate, dodecyl (meth)acrylate, cyclohexyl (meth)acrylate, trifluoroethyl (meth)acrylate, pentafluoropropyl (meth)acrylate and hexafluoroisopropyl (meth)acrylate.

4. The water-absorptive contact lens according to claim 1, wherein the monomer of component (b) is at least one member selected from the group consisting of allyl (meth)acrylate, vinyl (meth)acrylate, ethylene glycol di(meth)acrylate, diethylene glycol di(meth)acrylate, triethylene glycol di(meth)acrylate and dipropylene glycol di(meth)acrylate.

5. The water-absorptive contact lens according to claim 1, wherein (meth)acrylate polymer (A) has a hydrophilic monomer (c) copolymerized with the components (a) and (b), wherein the hydrophilic monomer is selected from the group consisting of a hydroxyl group-containing (meth)acrylate, (meth)acrylic acid, dimethyl (meth)acrylamide and N-vinylpyrrolidone.

6. The water-absorptive contact lens according to claim 1, wherein the molar ratio of component (a) to component (b) in (meth)acrylate polymer (A) is from 80/20 to 99.97/0.03, and the sum of components (a) and (b) is at least 70 mol % based on the total amount of monomers constituting (meth)acrylate polymer (A).

7. The water-absorptive contact lens according to claim 1, wherein (meth)acrylate polymer (A) has a number average molecular weight of from about 5,000 to about 200,000 and contains an average of from 1 to 5 polymerizable groups per molecule.

8. The water-absorptive contact lens according to claim 1, wherein the vinyl ester (B) is at least one vinyl ester selected from the group consisting of vinyl formate, vinyl acetate, vinyl propionate, vinyl butyrate, vinyl pivalate, vinyl laurate, vinyl stearate, vinyl monochloroacetate, vinyl trifluoroacetate and vinyl trichloroacetate.

9. The water-absorptive contact lens according to claim 1, wherein the crosslinking agent (C) is a compound of the formula:

wherein each of $R^4$ and $R^5$ which is the same or different, is $-CH=CH_2$ or $-CH_2-CH=CH_2$, and each of a and b is an integer of from 0 to 5, provided that when a is 0, b is 0, or the formula:

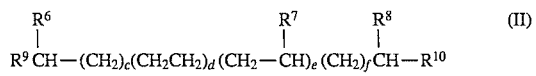

wherein each of $R^6$, $R^7$ and $R^8$, is the same or different, is $-CH=CH_2$ or $-CH_2-CH=CH_2$, each of $R^9$ and $R^{10}$, which is the same or different, is a hydrogen atom, $-CH_3$, $-(CH_2)_g-OH$ wherein g is an integer of from 1 to 5, $-(CH_2CH_2O-)_h-R^{11}$, wherein $R^{11}$ is a hydrogen atom or $-CH_3$, and h is an integer of from 0 to 12, or $-COOR^{12}$, wherein $R^{12}$ is a hydrogen atom or $-CH_3$, c is an integer of from 0 to 3, d is an integer of from 0 to 500, e is an integer of from 0 to 10,000, and f is an integer of from 0 to 3, or allyl (meth)acrylate.

10. A process for producing a water-absorptive contact lens, which comprises polymerizing polymer components consisting essentially of:
    (A) from 1 to 30% by weight of a (meth)acrylate polymer having at least one polymerizable group per molecule on an average obtained by copolymerizing (a) an alkyl (meth)acrylate and (b) a monomer having at least two polymerizable groups per molecule, as the main components;
    (B) from 45 to 95% by weight of a vinyl ester;
    (C) from 0.02 to 10% by weight of a crosslinking agent which is not decomposable by saponification; and
    (D) from 0.1 to 20% by weight of a crosslinking agent which is decomposable by saponification, to obtain a copolymer, mechanically processing the copolymer into a contact lens-shaped product and then saponifying the contact lens-shaped-product.

11. The process according to claim 10, wherein the crosslinking agent (D) is a compound of the formula:

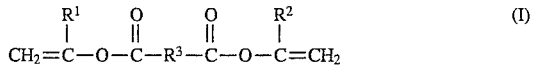

wherein each of $R^1$ and $R^2$ which is the same or different, is a hydrogen atom or a methyl group, and $R^3$ is a $C_{1-10}$ alkylene group.

* * * * *